United States Patent

Mills

[11] Patent Number: 5,889,984
[45] Date of Patent: Mar. 30, 1999

[54] FLOATING POINT AND INTEGER CONDITION COMPATIBILITY FOR CONDITIONAL BRANCHES AND CONDITIONAL MOVES

[75] Inventor: Jack D. Mills, San Jose, Calif.

[73] Assignee: Intel Corporation, Santa Clara, Calif.

[21] Appl. No.: 699,424

[22] Filed: Aug. 19, 1996

[51] Int. Cl.[6] ....................................................... G06F 9/00
[52] U.S. Cl. ............................................ 395/566; 395/563
[58] Field of Search ................................... 395/566, 567, 395/568, 564, 563, 800.41

[56] References Cited

U.S. PATENT DOCUMENTS

| 5,367,705 | 11/1994 | Sites et al. | 395/564 |
| 5,410,682 | 4/1995 | Sites et al. | 395/564 |
| 5,469,551 | 11/1995 | Sites et al. | 395/800.41 |
| 5,568,624 | 10/1996 | Sites et al. | 395/564 |
| 5,685,009 | 11/1997 | Blomgren et al. | 395/566 |

OTHER PUBLICATIONS

Sites et al., Alpha Architecture Reference Manual, pp. 1.4–1.6, 3.1–3.2,4.28, 4.78–4.79, 4.92–4.93,4.98–4.99, Jun. 1992.

MC88110, Second Generation RISC Microprocessor User's Manual, pp. 10–35,10–44, 10–56, Dec. 1991.

*Primary Examiner*—Richard L. Ellis
*Assistant Examiner*—Patrice L. Winder
*Attorney, Agent, or Firm*—Blakely, Sokoloff, Taylor & Zafman LLP

[57] ABSTRACT

In a processor where separate integer and floating point units are utilized, conditions generated in the integer unit are transferred and made compatible for use in the floating point unit by floating point conditional branch and move operations. Conversely, conditions generated in the floating point unit are transferred and made compatible for use in the integer unit by integer conditional branch and move operations. By providing semantic compatibility of conditions with conditional operations in both integer and floating point units, conditions can be generated in one numeric unit and operated in the other.

14 Claims, 6 Drawing Sheets

FLOATING POINT AND INTEGER CONDITION COMPATIBILITY FOR CONDITIONAL BRANCHES AND CONDITIONAL MOVES

BACKGROUND OF THE INVENTION

1. Field of the Invention

The present invention relates to the field of processors and, more particularly, to a technique for sharing the results of compare instructions between integer and floating point operations.

2. Related Application

The present invention is related to a copending patent application titled "Moderately Coupled Floating Point And Integer Units;" Ser. No. 08/563,499; filed Nov. 28, 1995 now U.S. Pat. No. 5,805,486.

3. Background of the Related Art

The use of integer and floating point units within or in conjunction with a processor is well-known in the art. The integer unit operates on numbers in a format capable of representing only integers (zero, positive or negative numbers without a fractional part). A typical integer unit is comprised of a number of registers for storing information and one or more execution units for operating on the stored information. A collection of registers that are accessed in a like fashion is called a register file. Typically, not all of the execution units in the integer unit will treat the contents of a register as an integer. For example, a shift execution unit operates on bit fields. Apart from the integer execution unit(s), the registers are also coupled to a bus for transfer of information to and from other units, such as memory. Thus, information can be loaded into a register of a register file from a unit such as memory, be operated on by an integer execution unit and the result stored in one of the registers, which result is typically transferred to storage elsewhere, such as in memory.

The floating point unit is configured similarly to the integer unit, but operates on numbers in a format capable of representing numbers with a fractional part. This format is incompatible with the format used to represent integer numbers. Due to the incompatible number formats, integer and floating point units typically have separate register files. The floating point format partitions a number into sign, exponent and significand (also referred to as mantissa) fields. Thus, the difference in number formats also requires a separate set of instructions for operating on integer and floating point numbers.

Processor architectures typically provide a mechanism to allow the conversion from one number format to the other, which involves the movement of data between the integer and floating point register files. For those processor architectures with separate integer and floating point register files, the processors implemented in these architectures typically have functionally separate integer and floating point units coupled to their corresponding register file. Thus, one or more integer execution units are coupled to the integer register file and one or more floating point execution units are coupled to the floating point register file. As part of the process of executing instructions, the processor routes integer instructions to the integer execution unit(s) and routes floating point instructions to the floating point execution unit(s).

The separation of the integer and floating point functions has significant advantages in performance, but has implications on conditional branch and conditional move operations in some instances. These implications generally take the form of transfers of data between the integer and floating point register files. Due to the difference between the integer register file format and the floating point register file format, these transfers may add significant overhead to certain conditional branch and conditional move operations, adversely impacting processor performance. One instance is in supplying a condition to a conditional branch (such as a conditional jump). This condition is typically generated by a compare instruction. It is useful to perform a conditional branch based on either integer or floating point data. In the case where two separate conditional branch instructions are defined in the architecture, one based on integer registers and one based on floating point registers, then the situation where a conditional branch is based on both integer and floating point data will require a data transfer due to the separation of the integer and floating point register files. In the case where the architecture defines only a single conditional branch based on integer registers, and where the floating point compare instruction is defined to write floating point registers, then the situation where a conditional branch is based on floating point data will also require the transfer of data.

Another instance is supplying a condition to a conditional move operation in which the condition is typically generated by a compare instruction. (See, for example, patent applications titled "Method For Conditionally Selecting Data;" Ser. No. 08/623,960; filed Mar. 29, 1996 and "Conditional Move Using A Compare Instruction Generating A Condition Field;" Ser. No. 08/660,094; filed Jun. 6, 1996).

It is useful to be able to perform a conditional move of floating point data based on the result of comparing integer data. It is also useful to be able to perform a conditional move of integer data based on the result of comparing floating point data. For those architectures that define two separate conditional move operations, one based on integer registers and one based on floating point registers, the two conditional move scenarios stated above will require a transfer of data. In the case where the architecture defines only a single conditional move based on integer registers and where the floating point compare instruction is defined to write floating point registers, then data transfer will be required for the case of conditionally moving floating point data based on the result of comparing integer data. Lastly, in an architecture that defines only a single conditional move based on integer registers and where the floating point compare instruction is defined to write integer registers, a conditional move of floating point data based on the result of comparing either integer or floating point data will require a transfer of data.

It is appreciated that architectural definitions other than those mentioned above are possible. For example, an architecture could be defined to have a single register file for storing both integer and floating point data rather than two separate register files. However each of these alternative architectural definitions typically has unique disadvantages in performance as compared to the architecture of the present invention.

Accordingly, the present invention describes a technique for allowing such conditional branching and conditional moving to be practiced on various combinations of integer and floating point data.

SUMMARY OF THE INVENTION

The present invention describes a technique for providing semantic compatibility of conditions, generated by integer and floating point compare instructions, to be used by integer and floating point conditional branch and conditional move operations. This compatibility allows conditional branches based on conditions originating from comparisons of either integer or floating point data, and of conditional moves moving either integer or floating point data based on conditions originating from comparisons of either integer or floating point data. The operation of the integer and floating point compare instructions, the instructions that perform a conditional move, and the instructions that transfer data between the integer and floating point register files are defined such that they inter-operate in a compatible fashion. Without this compatible definition, additional instructions would be necessary to perform the branching and conditional move functions described. The present invention allows conditions to be generated in one numeric unit, transferred to the other numeric unit, and then used in either conditional branches or conditional moves in the other numeric unit with a minimum of instructions and with improved performance.

In the preferred embodiment, this is achieved by defining the integer compare instruction to write a "condition" value of all "0"s or all "1"s into an integer register. The condition can then be used directly by integer conditional branches, or conditional moves operating on integer data, without the need for additional instructions. The least significant 16-bits of this condition (which will be all ones or all zeroes) can also be transferred to the sign and exponent fields of a floating point register and then used directly by floating point conditional branches, or conditional moves operating on floating point data, without the need for additional instructions. This is achieved by defining the floating point conditional branch, and the logical instructions that implement the conditional move of floating point data, to examine only the sign bit of a floating point register.

Conversely, the floating point compare instruction is defined to write all ones or all zeroes in the sign, exponent, and significand fields of a floating point register. This condition can then be used directly by floating point conditional branches or conditional moves operating on floating point data. The significand field (which will be all ones or all zeroes) can also be transferred to an integer register and then used directly by integer conditional branches, or conditional moves operating on integer data, without the need for additional instructions.

DETAILED DESCRIPTION OF THE
PREFERRED EMBODIMENT

A technique for cross-sharing conditions between integer and floating point operations for executing conditional branching and conditional move operations is described. In the following description, numerous specific details are set forth, such as specific instructions, instruction formats, bit length of words, and devices such as registers, etc., in order to provide a thorough understanding of the present invention. However, it will be appreciated by one skilled in the art that the present invention may be practiced without these specific details. In other instances, well known techniques and structures have not been described in detail in order not to obscure the present invention. It is to be noted that a preferred embodiment of the present invention is described in reference to a particular arrangement of integer and floating point units within a processor architecture, however, it is readily understood that other structures can be implemented without departing from the spirit and scope of the present invention. Furthermore, it is appreciated that the present invention is described in reference to a particular set of instructions, but the invention can be readily implemented in other instructions as well.

It is to be noted that the use of integer and floating point units (also referred to as numeric units) for providing arithmetic and logical calculations is well known in the art. The floating point unit can be configured separately from a processor to provide floating point operations, however, it is generally understood that more advanced processors will include the floating point unit as part of the processor. No matter how the units are configured and used, in most instances data located elsewhere (such as in memory) will be accessed by the numeric units. The data is loaded into a register, operated on by an appropriate integer or floating point execution unit and the result stored in a register, which can then be ultimately stored elsewhere, such as in memory.

Furthermore, it is appreciated that the integer and floating point units can each appear in a variety of configurations. For example, some of the structural elements can be shared by both of the units, while others operate strictly within one unit. For example, memory and buses can be shared by both units, but there will be separate execution units for executing on integer and floating point data. Additionally, other configurations may have the sharing of register(s) and/or execution unit(s) by both the integer and floating point units. Thus, it is appreciated that the present invention can be practiced with these other processor design configurations as well. However, in order to describe the present invention in its application, a particular design configuration is described below. The particular configuration is not being presented for the purpose of limiting the present invention.

Figure 1:
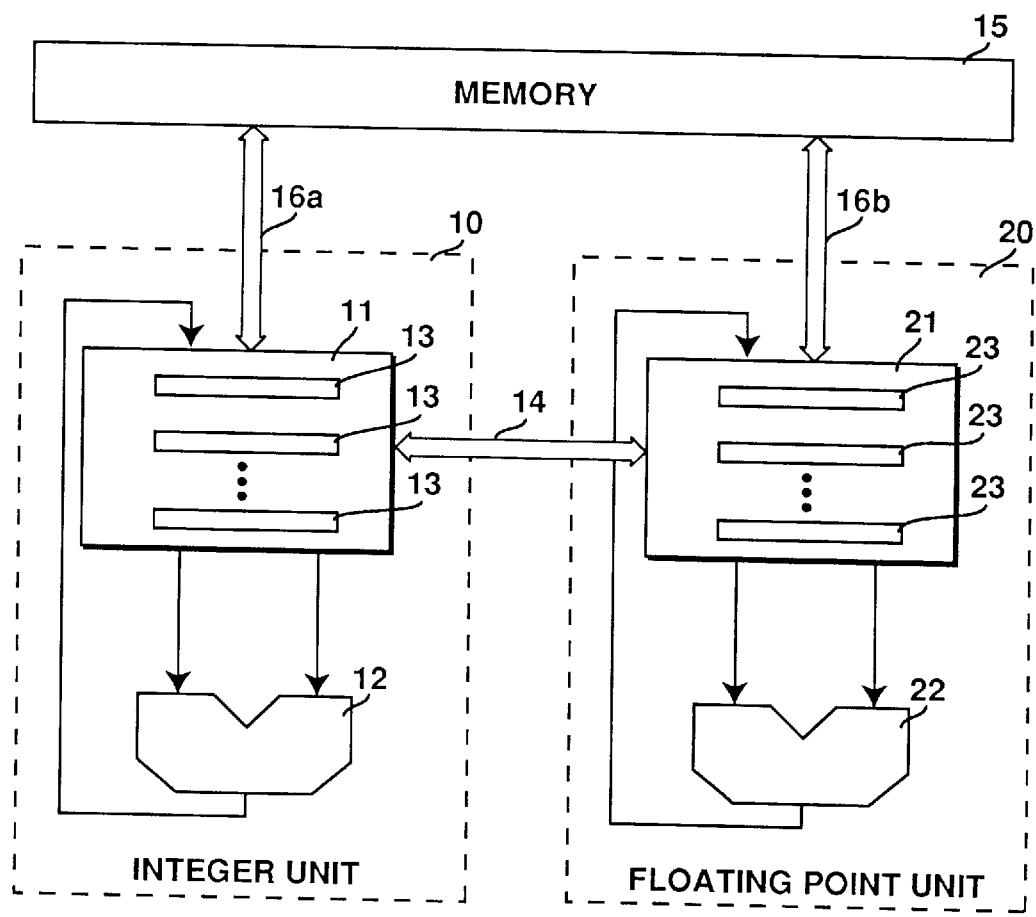
FIG. 1 is a block circuit diagram showing an integer unit and a floating point unit of a processor and a coupling between them, as well as to a memory, for the practice of the present invention.

Referring to FIG. 1, a processor design configuration utilizing separate integer and floating point execution units and register files is illustrated. An integer unit 10 is comprised of an integer register file 11 and one or more integer execution units 12 (only one is shown in FIG. 1). Register file 11 includes a plurality of integer registers 13 for storing (saving or having resident therein) information in integer format. Register file 11 is coupled to a memory 15 for loading stored information from memory 15. Typically the coupling is achieved by a bus 16a which is arbitrated by a bus interface or arbitration unit (not shown). The register file 11 is also coupled to the execution unit 12 in such a fashion as to allow simultaneous reading and writing of a plurality of registers 13. The accessed data from one or more of the registers 13 are then operated on by the execution unit 12 based on the instruction being executed. Then, the result of the operation is returned to a register 13 and/or to a location in memory 15 indicated by one of the registers 13. It is appreciated that the general operation of processors (which includes microprocessors) in decoding and executing an instruction, and memory accessing registers and memory locations to obtain data for the instructions to operate on and subsequently storing data, are well known in the art and, therefore, are not discussed at length in the description herein.

Equivalent to the integer unit 10, a floating point unit 20 is comprised of a floating point register file 21, containing a plurality of floating point registers 23, and one or more execution units 22 (only one is shown in FIG. 1). The registers 23 are configured to store (save or have resident therein) data in floating point format. Register file 21 is coupled to memory 15 also for loading stored information from memory 15 into one (or more) of the registers 23. Typically, the coupling of the floating point unit to memory is achieved by the use of a bus 16b, which is the same bus as bus 16a (but is shown separately in FIG. 2 for illustrative purpose). It is possible that buses 16 a–b could be completely separate buses, if such a configuration is desired. The register file 21 is coupled to the execution unit 22 in such a fashion as to allow simultaneous reading and writing of a plurality of registers 23. However, instructions for operating on floating point data are separate and distinct from the instructions which operate on integer data. Accordingly, floating point instructions are included in the processor instruction set for a particular processor architecture.

It is to be appreciated that the above described technique of utilizing separate integer and floating point units and register files is known in the art. Furthermore, how the data transfer is achieved between the integer unit 10 and the floating point unit 20 is not critical to the practice of the present invention, provided some means is available to transfer data between the two register files 11 and 21. Although a variety of known techniques can be utilized, in the preferred embodiment, a direct data transfer between the two register files 11 and 21 is achieved by a direct transfer bus 14. Such a bus 14 for coupling the integer register 11 and the floating point register file 21 is described in the aforementioned related application titled "Moderately Coupled Floating Point And Integer Units."

Figure 2:
FIG. 2 is an illustrative example of a 64-bit integer format used for operations in the integer unit of the present invention.

Additionally, the processor architecture defines a set of integer instructions that operate on information stored in integer format and a separate set of floating point instructions that operate on information stored in floating point format. The format of integer data as stored in integer registers 13 is depicted in FIG. 2. In the preferred embodiment integer data format is 64-bits in length with the bits numbered from 0 (least significant) to 63 (most significant). For signed integer data bit 63 is interpreted as the sign bit.

Figure 3:
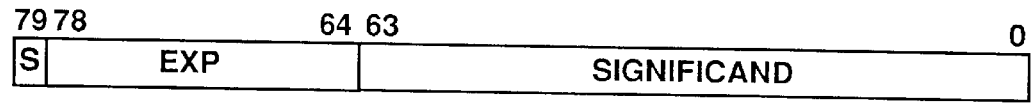
FIG. 3 is an illustrative example of an 80-bit floating point format used for operations in the floating point unit of the present invention.

The format of floating point data as stored in floating point registers 23 is depicted in FIG. 3. A floating point number is composed of three fields: sign, exponent, and significand (mantissa). In the preferred embodiment these fields have lengths of 1, 15, and 64 bits, respectively, for a total of 80 bits. The sign bit specifies the sign (positive or negative) of the floating point number and the exponent and significand fields combine to specify the value of the floating point number as $S * 2^E$, where "S" represents the value in the significand field and "E" represents the value in the exponent field.

It is appreciated that the format of integer and floating point numbers are known in the art. However, it is appreciated that the practice of the present invention is not dependent on the specific length of the integer or floating point registers. It applies equally well to processor architectures that define integer registers of lengths other than 64 bits (such as 16 or 32 bits), as well as those that define floating point registers of lengths other than 80 bits (such as 32, 64 or 128 bits).

An important function in any instruction set is a conditional branch operation, which is known in the art. It is necessary to provide a capability to allow branching that is conditional upon either integer or floating point data. Because the integer and floating point registers files are separate, the processor architecture of the preferred embodiment defines an integer conditional branch instruction and a separate floating point conditional branch instruction. The particular integer conditional branch instruction has one integer register source, one target displacement, and no destinations (source, displacement and destinations are instruction operands known in the art). Depending on the value of the register source (representing the condition), execution continues either at an instruction specified by the target displacement or at the next sequential instruction. The floating point conditional branch instruction performs an equivalent function based on the contents (value) of a floating point register 23. Alternate embodiments define the branch to be conditional on a value in a dedicated condition code (such as a flag) register. The preferred embodiment enables improved performance over architectures that define a single, or a small number of, condition code register(s) since the condition code register(s) is(are) a scarce resource and therefore may become a bottleneck during instruction execution.

Another important function of an instruction set is a conditional move operation, performed by a single conditional move instruction or by multiple instructions. For example, one integer conditional move operation has three integer register sources and one integer register destination. Depending on the value in the first source (representing the condition), either the second source or the third source is copied into the destination. Again, it is to be noted that the conditional move operation is implemented with one or multiple instructions. The manner in which the conditional move operation is executed (whether by the use of one or multiple instructions) is not critical to the practice of the present invention and, hence, the conditional move operation is described as a single instruction herein in order to simplify the description. The floating point conditional move operation functions equivalently using floating point registers.

It is necessary to provide a capability to allow the use of integer data to control the conditional movement of either integer or floating point data, as well as to provide a capability to allow the use of floating point data to control the conditional movement of either integer or floating point data. It is appreciated that alternative embodiments of conditional moves are also possible. For example, the conditional move may be implemented as a single instruction or may be defined to have two sources. In the latter case, depending on the value of the first source (the condition) either the second source is copied into the destination or the destination is left unchanged. The present invention applies equally well to these alternate embodiments. Again, it is to be emphasized that the integer conditional move operation or the floating point conditional move operation can be implemented by one or multiple instructions, but is described as a single instruction herein for ease of understanding.

The "condition" used by the conditional branch instruction and the conditional move instruction is typically supplied by a compare instruction, which is known in the art. The integer compare instruction has two integer register sources and one integer register destination. The destination is written with an indication of whether or not the two sources bear a specified relationship to each other (e.g. equal to, less than, greater than, etc.). The floating point compare instruction functions equivalently using floating point registers.

Finally, it is necessary to provide a capability to allow floating point instructions to operate on integer data and to allow integer instructions to operate on floating point data. This requires a mechanism to perform movement of data between the integer and floating point register files. Note that since the floating point registers are typically larger (longer in bit length) than the integer registers, individual fields in the floating point register (sign, exponent, significand) are transferred to/from an integer register. In the preferred embodiment this is implemented in the form of two instructions 12F and F21. The 12F instruction has two variants, 12F.EXP and 12F.SIG, each having one integer register source and one floating point register destination.

Figure 4A:
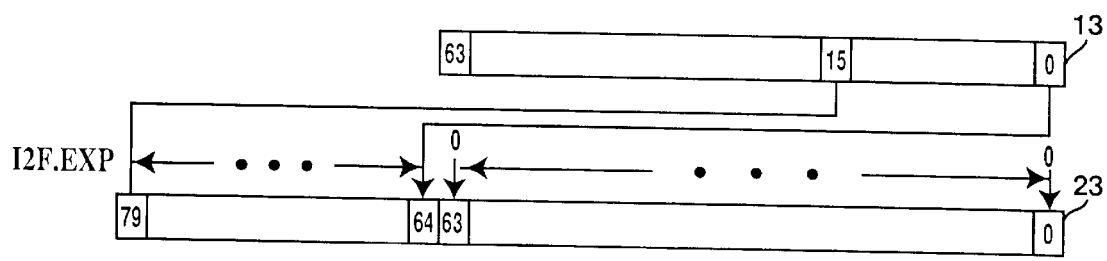
FIG. 4A is an illustration showing a transfer of 16 least significant bits of a 64-bit integer register to sign and exponent fields of an 80-bit floating point register.
Figure 4B:
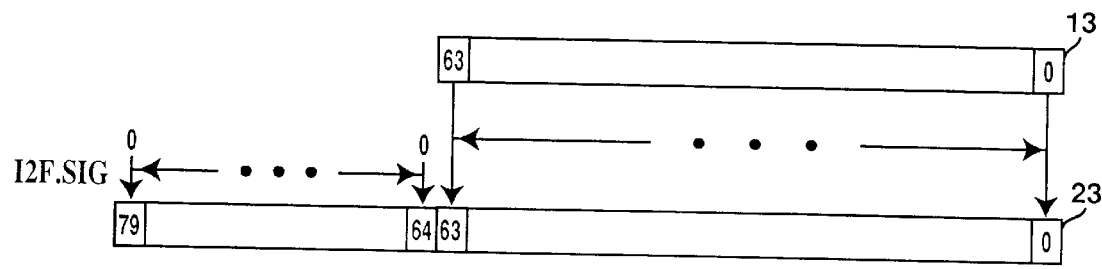
FIG. 4B is an illustration showing a transfer of 64 bits of a 64-bit integer register to a significand field of an 80-bit floating point register.

As shown in FIG. 4A, the 12F.EXP transfers the least significant 16-bits of an integer register 13 source to the sign and exponent fields of a floating point register 23 destination. The 12F.EXP instruction causes the significand field of the destination to be written (filled or padded) with all zeroes. Then, as shown in FIG. 4B, the 12F.SIG transfers the entire contents of an integer register source to the significand field of a floating point register destination. The 12F.SIG instruction causes the sign and exponent fields of the destination to be written with all zeroes.

Figure 5A:
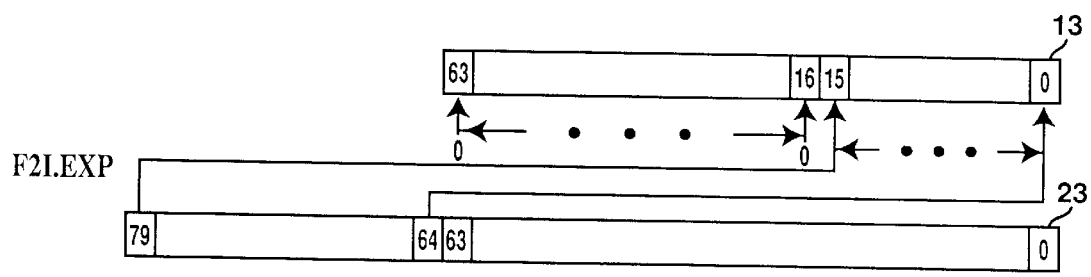
FIG. 5A is an illustration showing a transfer of sign and exponent fields of an 80-bit floating point register to least significant bits of a 64-bit integer register.
Figure 5B:
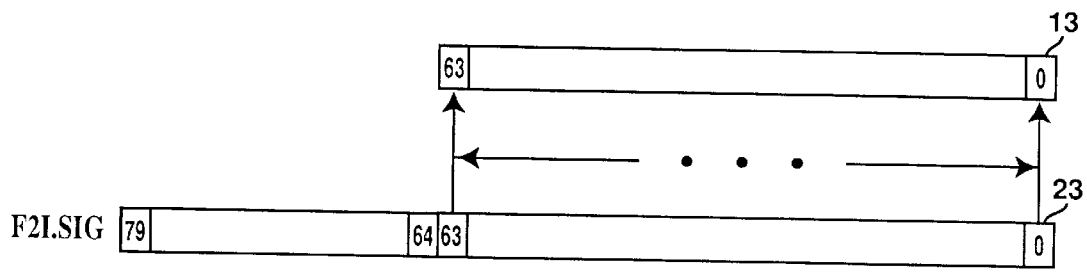
FIG. 5B is an illustration showing a transfer of a significant field of an 80-bit floating point register to a 64-bit integer register.

As shown in FIGS. 5A and 5B, the F21 instruction also has two variants (F21.EXP and F21.SIG), each having one floating point register 23 source and one integer register 13 destination, that perform the reverse transfer of their 12F counterparts. A more detailed operation is described in the aforementioned patent application entitled "Moderately Coupled Floating Point And Integer Units."

The detailed behavior of both the integer and floating point compare, conditional branch, conditional move, and transfer instructions are defined in such a fashion as to allow conditions generated in one register file 11 or 21 to be transferred to the other register file 21 or 11 with a minimum of instructions (and therefore provide an improvement in performance). Again, it is preferred to have bus 14 provide direct coupling between the two register files 11 and 21.

Figure 6:
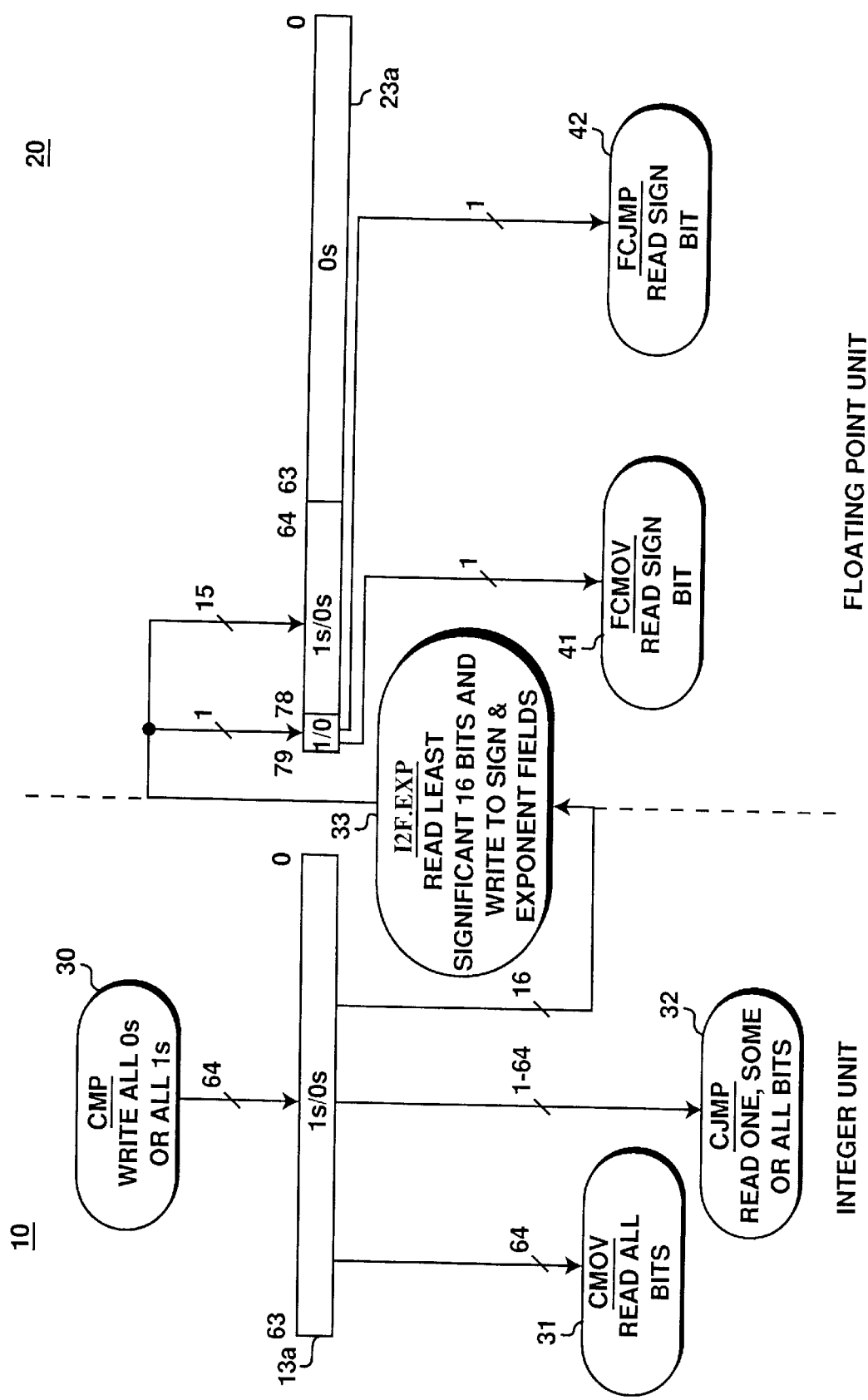
FIG. 6 shows a data flow diagram when a condition is generated in the integer unit by an integer compare instruction and the resulting condition value stored in an integer register is subsequently used by operations in the integer unit and operations in the floating point unit.

Referring to FIG. 6, it depicts the flow of data for specified instructions in the case of a condition that is generated in the integer register file. In FIG. 6 (as well as in the subsequent FIG. 7) oval shapes represent instructions, rectangles represent registers, and arrows are used to indicate the flow of data as a result of the instructions. An integer compare instruction (CMP) 30 is defined to write either all ones or all zeroes into its destination register 13a depending on whether its two sources bear the specified relationship (equal to, less than, greater than, etc.) to each other. An integer conditional move instruction (CMOV) 31 is defined to read all bits of its condition source register (which will be register 13a) and copy its second or third source into its destination depending on the value of the condition of the source register 13a. An integer conditional jump instruction (CJMP) 32 is defined to read one or more, or all bits in its condition source register 13a and branch (or not branch) as a function of this value. Thus, the integer compare operation communicates to the integer conditional jump and conditional move operations via bit value(s) in a specified integer register 13a.

The function of an 12F.EXP instruction 33, whose primary purpose is to transfer data from the integer to the floating point register files, is utilized to transfer a condition originating from an integer compare operation as well. In transferring an integer condition (such as the condition resulting from the CMP instruction 30), the 12F.EXP instruction copies the least significant 16-bits of the condition in register 13a (which will be either all ones or all zeroes) to the sign and exponent fields of a destination floating point register 23a, as shown in FIG. 4A (the significand field is zeroed).

A floating point conditional jump instruction (FCJMP) 42 is defined to read the sign bit of its condition source register 23a and branch (or not branch) as a function of this value. A floating point conditional move instruction (FCMOV) 41 is also defined to read the sign bit of its condition source register 23a and copy its second or third source into its destination depending on the value of the condition of the source register 13a.

The synergistic definition of the CMP 30, CJMP 32, CMOV 31, 12F.EXP 33, FCJMP 42, and FCMOV 41 instructions allows conditions generated in the integer register file 11 to be used in the floating point register file 21 without the need to define additional instructions in the instruction set (beyond those already required for basic operation), or the need for additional instructions for processing during program execution, or the need for conversion between floating point and integer data formats.

Figure 7:
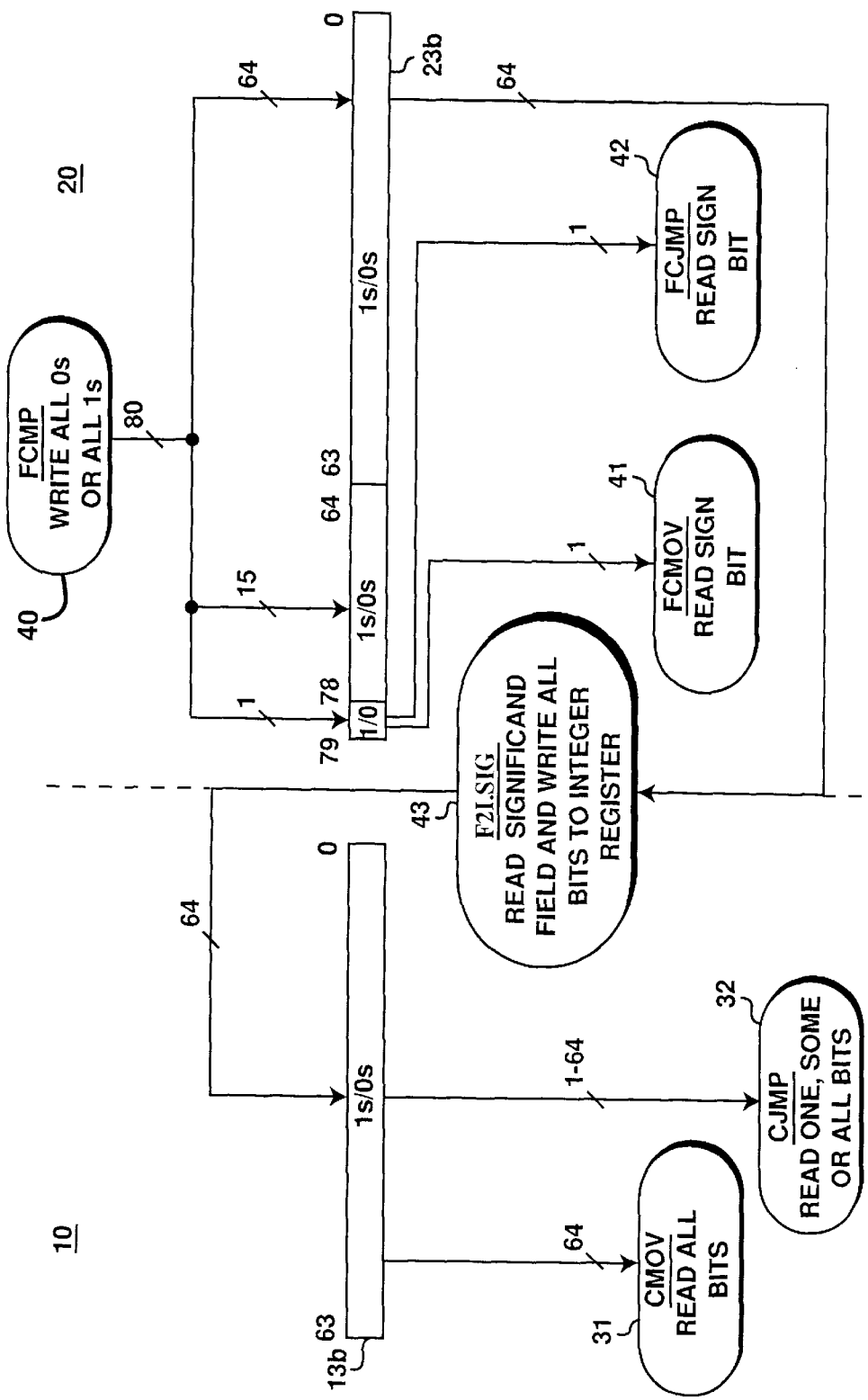
FIG. 7 shows a data flow diagram when a condition is generated in the floating point unit by a floating point compare instruction and the resulting condition value stored in a floating point register is subsequently used by operations in the floating point unit and operations in the integer unit.

Referring to FIG. 7, it depicts the flow of data for the case of a condition that is generated in the floating point register file. A floating point compare instruction (FCMP) 40 is defined to write either all ones or all zeroes into its destination register 23b depending on whether its two sources bear the specified relationship to each other. The floating point conditional move instruction (FCMOV) 41 is employed to read the sign bit of its condition source register 23b and copy its second or third source into its destination depending on the value of the condition in source register 23b. The floating point conditional jump instruction (FCJMP) 42 is employed to read the sign bit of its condition source register 23b and branch (or not branch) as a function of this value. Thus, the floating point compare operation communicates to the floating point conditional jump and conditional move operations via the sign bit in a floating point register 23b.

The function of a F21.SIG instruction 43, whose primary purpose is to transfer data from the floating point to the integer register files, is utilized to transfer a condition originating from a floating point compare instruction 40 as well. In transferring an integer condition, the F21.SIG instruction copies all bits of the significand field of the condition in register 23b (which will be either all ones or all zeroes) to all bits of its integer register destination 13b, as shown in FIG. 5B. The integer conditional jump instruction (CJMP) 32 is employed to read one or more, or all bits of its condition source register 13b and branch (or not branch) as a function of this value. The integer conditional move instruction (CMOV) 31 is employed to read all bits of its condition source register 13 and copy its second or third source into its destination depending on the value of the condition of source register 13a.

The synergistic definition of the FCMP 40, FCJMP 42, FCMOV 41, F21.SIG 43, CJMP 31, and CMOV 31 instructions allows conditions generated in the floating point register file 21 to be used in the integer register file 11 without the need to define additional instructions in the instruction set (beyond those already required for basic operation), or the need of additional instructions for processing during program execution, or the need for conversion between floating point and integer data formats.

Note that from the perspective of the readers of integer conditions, namely CMOV 31 and CJMP 32, there is no difference in a condition generated locally in the integer register file 11 by CMP 30 and a condition generated remotely in the floating point register file 21 by FCMP 40, which is then transferred to the integer register file 11 by the F21.SIG instruction 43. Note also that from the perspective of the readers of floating point conditions, namely FCMOV 41 and FCJMP 42, there is no difference in a condition generated locally in the floating point register file 21 by the FCMP instruction 40 and a condition generated remotely in the integer register file by CMP 30 which is then transferred to the floating point register file 11 by the 12F.EXP instruction 33.

The ability to allow integer and floating point conditions to be transferred between integer and floating point registers in a manner permitting the use of these conditions to be used in both integer and floating point units, specifically by integer and floating point conditional branch and conditional move operations, allows for more flexibility in programming a processor and increases the performance of the processor, which flexibility and performance translate into competitive advantages for products implementing the enhancements. This ability also reduces the number of required instructions since conditional instructions for one of the numeric units can be utilized for operations on conditions generated in the other numeric unit. By providing semantic compatibility of conditions with conditional operations in both integer and floating point units, conditions can be generated in one numeric unit and operated in the other.

Thus, a floating point and integer condition compatibility for conditional branches in a processor is described. It has been appreciated that the present invention can be practiced in a variety of ways. The preferred embodiment describes one technique which is applicable to integer-floating point transfers being utilized in a particular novel processor architecture. However, this example is not to be regarded as limiting the present invention to the specific description of the embodiment. Furthermore, it is to be appreciated that the integer and floating point units (whether together in one processor or as separate units) are typically utilized in a computer system such as a personal computer (PC) system to provide the necessary processing capability for the computer system.

I claim:

1. A method of operation for a processor which includes an integer unit having an integer register file, and a floating point unit having a floating point register file, said method comprising the steps of:

generating a condition value in either said integer unit or said floating point unit by executing a compare instruction which writes either all 1s or all 0s into a first register, wherein said first register is associated with said integer register file when said condition value is generated in said integer unit, said first register being associated with said floating point register file when said condition value is generated in said floating point unit;

transferring said condition value from said first register to a second register, wherein said second register is associated with said integer register file whenever said first register is associated with said floating point register file, said second register being associated with said floating point register file whenever said first register is associated with said integer register file;

executing a conditional instruction that uses said condition value stored in said second register.

2. The method of claim 1 wherein said transferring step causes either a 1 or a 0 to be written into a sign field of said second register.

3. The method of claim 1 wherein said conditional instruction comprises a floating point conditional jump instruction.

4. The method of claim 1 wherein said conditional instruction comprises a floating point conditional move instruction.

5. The method of claim 1 wherein said conditional instruction comprises an integer conditional jump instruction.

6. The method of claim 1 wherein said conditional instruction comprises an integer conditional move instruction.

7. A processor for executing integer and floating point instructions utilizing respective integer and floating point processing units, said processor comprising:

an integer register file including a plurality of integer registers, each integer register being compatible with a first format and having a first bit length, wherein an integer condition value generated by said integer processing unit is stored in a first integer register, said integer condition value comprising either a first binary value or a second binary value;

a floating point register file including a plurality of floating point registers, each floating point register being compatible with a second format and having a second bit length, wherein a floating point condition value generated by said floating point processing unit is stored in a first floating point register, said floating point condition value comprising either said first binary value or said second binary value;

a bus coupling said integer and floating point register files; and a first instruction, execution of said first instruction causing said integer condition value to be transferred across said bus from said first integer register compatible with said first format to one or more floating point registers compatible with said second format.

8. The processor of claim 7 wherein said first binary value comprises all 1s and said second binary value comprises all 0s.

9. The processor of claim 7 wherein execution of said first instruction further causes a 1 or a 0 to be written into a sign bit field of one of said floating point registers.

10. The processor of claim 9 further comprising a second instruction, execution of said second instruction causing said sign field to be read.

11. The processor of claim 7 further comprising a third instruction, execution of said third instruction causing said floating point condition value to be transferred across said bus from said first floating point register compatible with said second format to an integer register compatible with said first format.

12. The processor of claim 11 further comprising a fourth instruction, execution of said fourth instruction causing one or more bits of said integer register to be read.

13. The processor of claim 12 wherein said fourth instruction comprises a floating point conditional jump instruction.

14. The processor of claim 12 wherein said fourth instruction comprises a floating point conditional move instruction.

* * * * *

UNITED STATES PATENT AND TRADEMARK OFFICE
CERTIFICATE OF CORRECTION

PATENT NO.   :   5,889,984
DATED        :   March 30, 1999
INVENTOR(S)  :   Jack D. Mills It is certified that error appears in the above-identified patent and that said Letters Patent is hereby corrected as shown below:

In column 5 at line 21 delete "memory" following "and" and before "accessing"

Signed and Sealed this

Fourth Day of January, 2000

Attest:

Attesting Officer

Acting Commissioner of Patents and Trademarks